(12) United States Patent
Klaassen et al.

(10) Patent No.: US 6,331,919 B1
(45) Date of Patent: Dec. 18, 2001

(54) WRITE HEAD IMPEDANCE TERMINATION IN MAGNETIC RECORDING

(75) Inventors: Klaassen Berend Klaassen; Jacobus Cornelis Leonardus Van Peppen, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/369,320

(22) Filed: Aug. 6, 1999

(51) Int. Cl.[7] ................................ G11B 5/09; G11B 5/02
(52) U.S. Cl. ................................................ 360/46; 360/68
(58) Field of Search ................................ 360/67, 46, 68

(56) References Cited

U.S. PATENT DOCUMENTS

| 5,121,273 | 6/1992 | Slezak | 360/264.2 |
| 5,309,298 | * 5/1994 | Klaasen et al. | 360/65 |
| 5,440,434 | 8/1995 | Kanegae | 360/65 |
| 5,491,597 | 2/1996 | Bennin et al. | 360/245.9 |
| 5,608,591 | 3/1997 | Klaassen | 360/245.9 |
| 6,014,281 | * 1/2000 | Contreras | 360/67 |
| 6,130,795 | * 10/2000 | Freitas et al. | 360/67 |

* cited by examiner

Primary Examiner—Regina Y. Neal
(74) Attorney, Agent, or Firm—Khanh Q. Tran, Esq.; Banner & Witcoff, Ltd.

(57) ABSTRACT

A magnetic recording circuit includes a write driver output stage, a magnetic write head and an interconnect circuit. The write driver output stage has an output and an output impedance. The magnetic write head has an input and an input impedance. The interconnect circuit has an input, an output and a selected characteristic impedance $Z_0$. The input of the interconnect circuit is coupled to the output of the write driver output stage, the output of the interconnect circuit is coupled to the input of the write head. The interconnect circuit can be one of, or both, source-terminated so that the output impedance of the write driver output stage is substantially equal to the selected characteristic impedance $Z_0$ of the interconnect circuit, and load-terminated so that the input impedance of the write head is substantially equal to the characteristic impedance $Z_0$ of the interconnect circuit.

22 Claims, 3 Drawing Sheets

WRITE HEAD IMPEDANCE TERMINATION IN MAGNETIC RECORDING

CROSS-REFERENCE TO RELATED APPLICATION

The present application is related to U.S. patent application Ser. No. 09/556,983, entitled "Inductive Magnetic Recording Head With Impedance Matching Elements," invented by R. E. Fontana et al., filed Apr. 24, 2000, and incorporated by reference herein.

BACKGROUND OF THE INVENTION

1. Field of the Invention

The present invention relates to write driver circuits for magnetic recording. More particularly, the present invention relates to write driver circuits for high data rate magnetic recording and techniques for fabricating such write driver circuits.

2. Description of the Related Art

FIG. 1 shows a high RPM disk drive 10 having a magnetic read/write head (or a recording slider) that is positioned over a selected track on a magnetic disk 11 for recording data using a servo system. The stage servo system includes a voice-coil motor (VCM) 13 for coarse positioning a read/write head suspension 12 and may include a microactuator, or micropositioner, for fine positioning the read/write head over the selected track. FIG. 2 shows an enlarged exploded view of the read/write head end of suspension 12 in the case when a microactuator is also being used. An electrostatic rotary microactuator 14 is attached to a gimbal structure 15 on suspension 12, and a slider 16 is attached to the microactuator. A read/write head 17 is fabricated as part of slider 16.

For high data rate magnetic recording, the write path of a recording channel front-end requires a wide bandwidth and short waveform rise and fall times in order to accurately transfer high-frequency write data patterns to a magnetic medium) such as a disk. The virite signal includes abrupt switching, that is, polarity reversals of the signal, that represent the information that is to-be-recorded. The abrupt switching generates high-frequency harmonics that must be transferred from the write driver to the magnetic write transducer (write head) in order that the write signal is accurately transferred onto the magnetic medium.

Conventional write drivers have a high output impedance, essentially forming a current source for the write current needed to drive an inductive write head. The output impedance is much greater than the head input impedance. FIG. 3 shows a conventional write driver circuit 30 that is connected directly to the (bonding) terminals of a magnetic write transducer (write head) 32 through a suspension interconnect 31. Write driver circuit 30 is configured as a current commutating write-driver circuit and includes two switches S and two switches $\bar{S}$ that are connected in an H configuration. An obstacle in transferring the write data output signal from write driver circuit 30 to write head 32 is in the propagation of the write signal along interconnect 31 between write driver circuit 30 and the write head 32.

The invention described below improves the propagation of the write signal along an interconnect between a write driver circuit and a write head, while maintaining the signal integrity, i.e., the signal properties essential for high data rate writing.

SUMMARY OF THE INVENTION

The present invention provides a technique for improving propagation of the write signal along an interconnect between a write driver circuit and a write head. The advantages of the present invention are provided by a magnetic recording circuit that includes an electronic write driver output stage having a write signal output, a magnetic write head having a write signal input and an interconnect circuit having a selected characteristic impedance $Z_0$. The input of the interconnect circuit is coupled to the write signal output of the write driver output stage, and the output of the interconnect circuit is coupled to the write signal input of the write head. According to the invention, the interconnect circuit can be one of, or both, source-terminated and load-terminated. When the interconnect circuit is source-terminated, the write driver output stage includes a source-terminating circuit so that an output impedance $Z_D$ formed by the write driver output stage and the source-terminating circuit is substantially equal to the selected characteristic impedance $Z_0$ of the interconnect circuit. When the interconnect circuit is load-terminated, the magnetic write head includes a load-terminating circuit so that an input impedance $Z_I$ formed by the magnetic write head and the load-terminating circuit is substantially equal to the characteristic impedance $Z_0$ of the interconnect circuit.

When the write driver output stage is a current-type write driver having an output impedance that is greater than the characteristic impedance $Z_0$ of the interconnect circuit, the source-terminating circuit is a resistance that is connected in shunt across the output impedance of the write driver output stage. Thus, the output impedance $Z_D$ formed by the impedance of the write driver output stage and the source-terminating circuit is substantially equal to the selected characteristic impedance $Z_0$ of the interconnect circuit. Alternatively, when the write driver output stage is a current-type write driver output stage having an output impedance that is greater than the selected characteristic impedance $Z_0$ of the interconnect circuit, the magnetic recording circuit further includes a feedback circuit connected in parallel with the current-type write driver output stage. The feedback circuit reduces the output impedance of the output stage so that the output impedance of the write driver substantially equals the selected characteristic impedance $Z_0$ of the interconnect circuit. When the write driver output stage is a voltage-type write driver output stage having an output impedance that is less that the characteristic impedance $Z_0$ of the interconnect circuit, the source-terminating circuit is a resistance connected in series with the output impedance of the write driver output stage. As such, the output impedance $Z_D$ formed by the impedance of the write driver output stage and the source-terminating circuit is substantially equal to the selected characteristic impedance $Z_0$ of the interconnect circuit.

According to the invention, the load-terminating circuit is formed by electrical components that are external to the magnetic write head, and can be mounted on a suspension of the interconnect circuit. Alternatively, the electrical components that are external to the magnetic write head can be fabricated on a slider and integrated with the magnetic write head using the same fabrication processing.

When the magnetic write head includes a coil having an inductance $L_h$ and a resistance $R_h$, and the load terminating circuit includes a first resistance $R_{ex}$ connected in a first series circuit with the coil of the magnetic write head, and a second resistance R connected in a second series circuit with a capacitance C, the first and second series circuits are connected in parallel across the output of the interconnect circuit. The characteristic impedance $Z_0$ of the interconnect circuit, the inductance $L_h$ of the coil, the resistance $R_h$ of the coil, and the first resistance $R_{ex}$, the second resistance R and the capacitance C of the load-terminating network are related by $$Z_0 \simeq R \simeq R_{ex} + R_h \simeq \sqrt{\frac{L_h}{C}}.$$

When the magnetic write head includes a coil having an inductance $L_h$, a resistance $R_h$, and a parasitic capacitance $C_{par}$, and the load-terminating circuit includes a first resistance $R_{ex}$ connected in a first series circuit with the coil of the magnetic write head, and a second resistance R connected in a second series circuit with a capacitance C, the first and second series circuit are connected in parallel across the output of the interconnect circuit. The characteristic impedance $Z_0$ of the interconnect circuit, the inductance $L_h$, the resistance $R_h$ and the parasitic capacitance $C_{par}$ of the coil, and the first resistance $R_{ex}$, the second resistance R and the capacitance C of the load-terminating circuit are related by $$Z_0 \simeq R \simeq R_{ex} + R_h \simeq \sqrt{\frac{L_h - C_{par}R_h^2}{C}}.$$

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
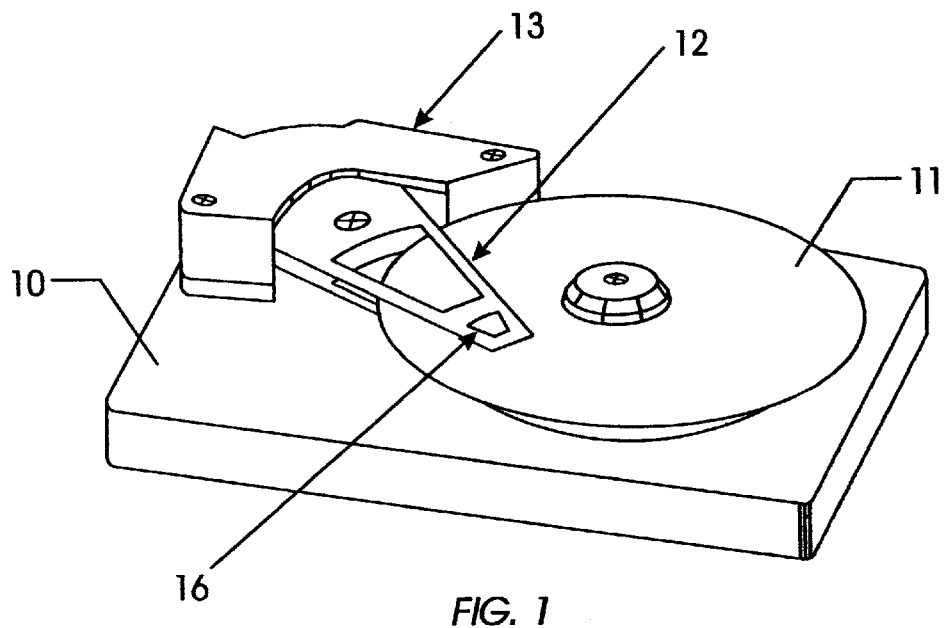
FIG. 1 shows a disk drive having a magnetic read/write head that is positioned over a selected track on a magnetic disk for recording data.
Figure 2:
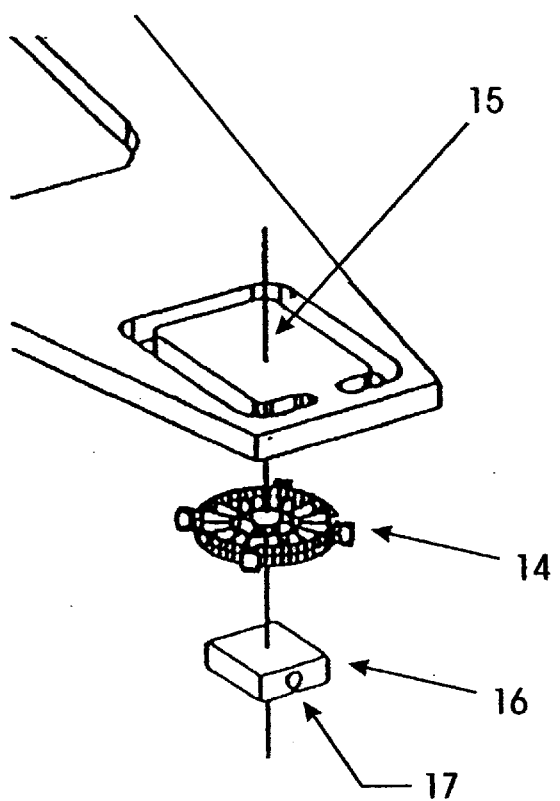
FIG. 2 shows an enlarged exploded view of the read/write head end of a head suspension, which may be used in the disk drive of FIG. 1.

The present invention provides a suspension interconnection having a selected characteristic impedance that is terminated on either the write driver side (source termination) or on the head side (load termination) with an impedance that is substantially equal to the selected characteristic impedance of the interconnect. The selected characteristic impedance of the suspension interconnect can be attained for the load-terminated case by using passive electrical components, such as resistors, capacitors, inductors and transformers, that can be formed at the backside of a slider using the same processing that is used for fabricating the read and the write heads on the backside of the slider. These passive electrical components can also be implemented (for instance, in surface mounting technology) at a location close to the write head, i.e., on top of the slider body or on the suspension. The selected characteristic impedance of the suspension interconnect can in the case of source termination be achieved by placing an electrical impedance in parallel across the output of a current-type write driver; or a series impedance in the output of a voltage-type write driver, or by applying feedback networks across the output stage of the write driver such that the output impedance of this stage becomes substantially equal to the selected characteristic impedance of the suspension interconnect. The above impedances can be implemented on the write driver chip, or off the chip close to the output terminals of the chip.

Thus, while a conventional electronic module containing the write driver (the read/write module) is located away from the write head, the present invention allows the electronic module to be located at the base plate of the disk drive enclosure, on the actuator arm that moves the read and write transducers (heads) to a desired data track on the disks, or on the suspension spring assembly attached to the actuator arm holding the read/write heads. Additionally, a termination circuit according to the present invention allows write head designs to be used that have appreciable inductance (30–75 nH) for high data rate applications (>75 MB/s).

The suspension interconnect can be designed to have a selected characteristic impedance $Z_0$ by, for example, designing the conductive traces to have a certain width (W) and height (h) over a conductive ground plane (the suspension spring), separated by a dielectric material having a certain thickness (t) and electrical permittivity ($\epsilon_r$). See, for example, U.S. Pat. No. 5,608,591 to Klaassen, which is incorporated by reference herein. If the characteristic impedance of free space is denoted by $Z_{oa}$ ($\cong$377 Ω), the characteristic impedance $Z_0'$ of a "micro-strip line" is to first order approximation given by:

$$Z_0' = Z_{oa} \frac{t}{\sqrt{\epsilon_r}\, W_{eff}\left[1.836 + 1.735\epsilon_r - 0.0724\frac{W_{eff}}{t}\right]},$$

where the effective line width $W_{eff}$ is $$W_{eff} = W + \frac{h}{\pi}\left\{\ln\left[\frac{2t}{h}\right] + 1\right\}.$$

It is apparent from these equations that, by a proper choice of $\epsilon_r$, t, W, and h, a particular value of characteristic impedance $Z_0'$ can be selected. The range for $Z_0'$ is determined by the range over which the interconnect parameters $\epsilon_r$, t, W, and h can be varied. For a write interconnect, a balanced pair micro-strip fines is used and as a result the write interconnect charcteristic impedance $Z_0=2Z_0'$. For the write interconnect, it is desirable to made $Z_0$ as high as permitted by the allowed values and the tolerances of the interconnect parameters. Such a "high impedance" write interconnect allows a relatively wider bandwidth and shorter rise and fall times for a given write head inductance and write driver electronics. For instance, with the following minimum values: $\epsilon_r=2.7$, $t_{max}=20$ μm, $h_{min}=10$ μm, the characteristic impedance $Z_0$ become 80.8 Ω.

Figure 4:
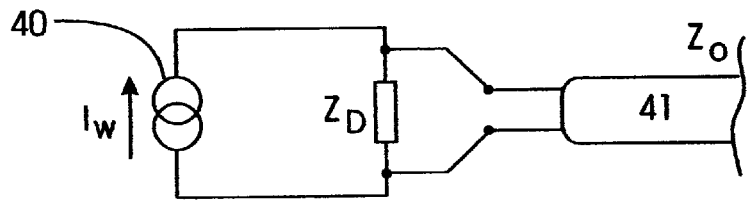
FIG. 4 shows a current-type write driver circuit that is source-terminated to the characteristic impedance $Z_0$ of a suspension interconnect according to the present invention.

The write driver in FIG. 4 shows a current-type write driver circuit 40 that is source-terminated to the characteristic impedance $Z_0$ of a suspension interconnect 41 according to the present invention by using an electrical impedance $Z_D$ circuited in parallel across the current-type write driver 40, whose magnitude is substantially equal to $Z_0$. Write driver 40 has an output impedance that is much greater than the characteristic impedance $Z_0$ of any interconnect. Impedance $Z_D$ can be placed on the electronics chip of the read/write module, or external to the electronics chip, but in close proximity to the output of the current-type write driver.

Figure 5:
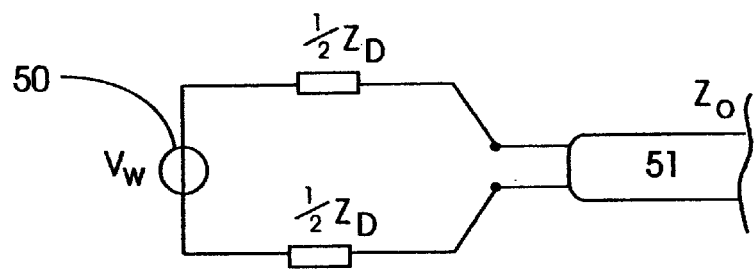
FIG. 5 shows a voltage-type write driver that is source-terminated to the characteristic impedance $Z_0$ of a suspension interconnect according to the present invention.

FIG. 5 shows a voltage-type write driver 50 that is source-terminated to the characteristic impedance $Z_0$ of a suspension interconnect 51 according to the present invention. Voltage-type write driver 50 has an output impedance that is much less than characteristic impedance $Z_0$ of any interconnect. The write driver circuit 50 is source terminated to suspension interconnect 51 by an electrical impedance $Z_D$ that is placed in series with the output of write driver circuit 50. Impedance $Z_D$ is selected to be substantially equal to $Z_0$. For a balanced drive, the source-terminated impedance can be distributed by placing $\frac{1}{2}Z_0$ in both output leads, as indicated in FIG. 5.

Figure 6:
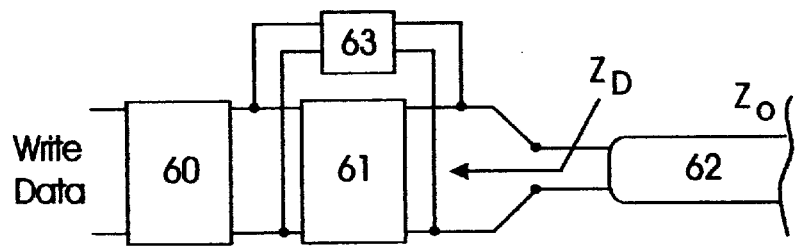
FIG. 6 shows a schematic block diagram of a write driver circuit using electronic feedback to create an output impedance $Z_0$ according to the present invention.

FIG. 6 shows a schematic block diagram of a source-terminated write driver circuit having an output impedance $Z_D$ that is substantially equal to $Z_0$ and that is obtained by applying electronic feedback to the output stage of a write driver, thereby decreasing the output impedance of a current driver to the impedance $Z_0$. Electronic feedback can also be used for increasing the output impedance of a voltage-type write driver to substantially equal $Z_0$. In FIG. 6, write data is input to a pre-driver circuit 60 before being applied to an output stage 61. The output of output stage 61 is connected to a suspension interconnect 62 having a characteristic impedance $Z_0$. A feedback circuit 63 is connected in parallel with output stage 61 to adjust the output impedance of the write driver circuit.

Figure 7:
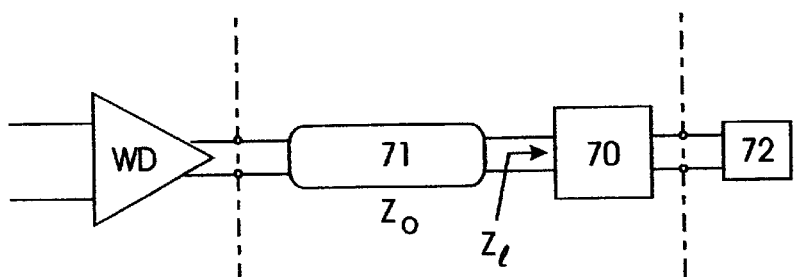
FIG. 7 shows a load-side termination network that is connected between the end of a suspension interconnect and a write head according to the present invention.

Load termination of the write head side of a suspension interconnect can be provided by placing a network of electrical impedances, such as resistors, capacitors, inductors and/or transformers, between the end of the suspension interconnect and the write head, such as shown in FIG. 7. FIG. 7 shows a network 70 that is connected between the end of a suspension interconnect 71 and a write head 72. The components of network 70 can be located on the slider body with the write head, and can be fabricated during the same fabrication processes required for making the read and write heads on the trailing side of the slider body. Network 70 can also be implemented with discrete elements in surface mount technology on top of the slider body. Alternatively, network 70 can be fabricated on the suspension at some convenient location along the suspension, but preferably close to the head.

Figure 8:
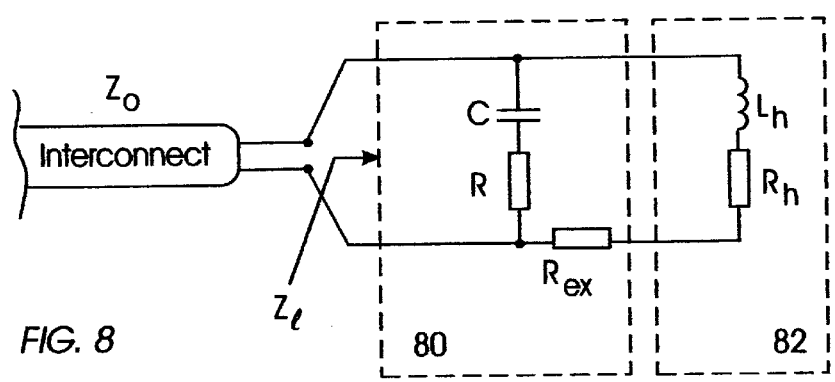
FIG. 8 shows a specific embodiment of a load-side termination network according to the present invention.

FIG. 8 shows a configuration of an electrical network 80 for a load-side termination according to the present invention. In FIG. 8, $L_h$ and $R_h$ are the inductance and resistance, respectively, of the coil of write head 82. Electrical components R, C and $R_{ex}$ are external to write head 82, and form the load terminating network 80. Design rules for obtaining load termination are:

$$Z_l = R = R_{ex} + R_h = \sqrt{\frac{L_h}{C}} = Z_0$$

If this design rule is satisfied, the input impedance $Z_l$ of load termination network 80 is equal to $Z_0$. Of course, this is only the case as long as write head 82 is connected across the output of the network 80. As an example, consider the situation when $Z_0$=100 Ω. It follows that R=100 Ω, $R_{ex}$=75 Ω, $R_h$=25 Ω, $L_h$=25 nH, and C=2.5 pF.

Figure 3:
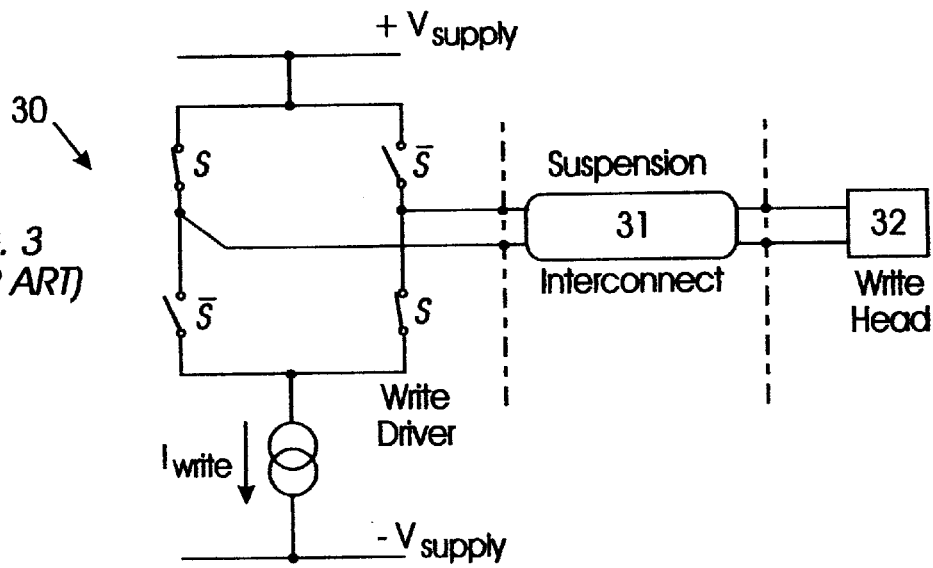
FIG. 3 shows a conventional electronic write driver circuit that is connected to a magnetic write head through a suspension interconnect.

Resistance $R_{ex}$ can be included in the head coil and leads by fabricating thinner and narrower conductors accordingly. The input impedance which the write driver circuit "sees" in the case of a load-terminated suspension is $Z_0$. Consequently, the -write driver circuit is not required to accommodate the inductive voltage transients, such as those occurring in conventional write drivers (FIG. 3), at the moments of write current reversal. Thus, according to the present invention, a write driver circuit can be designed to have a lower power supply voltage $V_S$, which, for the same write current, will also give a lower power dissipation.

The current rise $\tau_r$ and fall times $\tau_f$ for the head inductance $L_h$ of FIG. 8 are for this specific type of load termination given by:

$$\tau_r = \tau_f = \frac{L_h}{R_h + R_{ex}} = \frac{L_h}{R} = \frac{L_h}{Z_0}.$$

The fastest switching is obtained by making the characteristic impedance $Z_0$ as large as possible and the head inductance $L_h$ as small as possible. If, in FIG. 8, there is a substantial parasitic capacitance $C_{par}$ across the write head, the optimum load terminating network is given by the following design rule:

$$Z_l = R = R_{ex} + R_h = \sqrt{\frac{L_h - C_{par}R_h^2}{C}} = Z_0.$$

Of course, the present invention is not restricted to the specific embodiment of a load-side termination network such as shown in FIG. 8. Depending on the electrical impedance of the coil of the write head, any network of R, L and C (including a transformer), producing an input impedance $Z_l$ that is substantially equal to the suspension interconnect impedance $Z_0$ over the frequency range of interest, when inserted between the write head and the suspension interconnect is within the scope of the present invention.

Termination of an interconnect using external discrete capacitors and resistors on the suspension interconnect near the head is part of this invention as is the placement of external discrete surface mount components on the slider body. Another approach would be to simply drive the interconnect and head with larger and larger voltages to obtain a faster response. Such an approach, however, is impractical because of voltage limitations on power supplies that are used in disk drives and the maximum voltage that can be sustained by the certain silicon integrated circuit process. Also, the power dissipation would become prohibitively large. Yet another approach would be to scale the yoke and coil to reduce inductance of the write head to relatively low values. This type of an approach suffers from heating problems because the coils consequently have a relatively high resistance and the power is dissipated in a -relatively small region.

Figure 9:
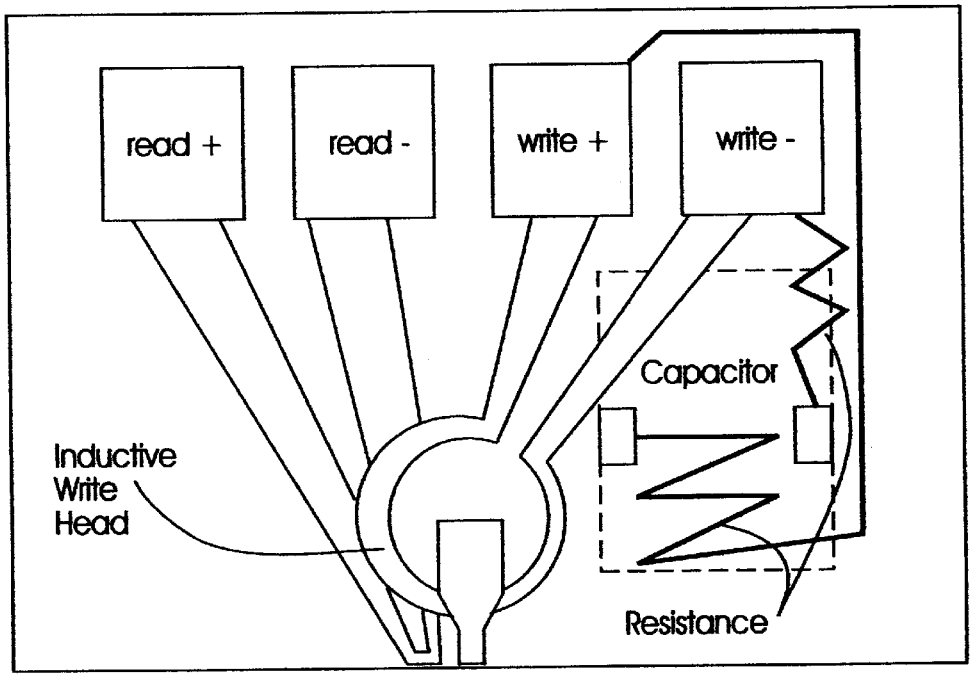
FIG. 9 shows a view of a read/write head having an added resistance and a parallel plate capacitor that are fabricated into the connecting leads of an inductive write head according to the present invention.

FIG. 9 shows a read/write head having an added resistance and a parallel plate capacitor that are fabricated into the connecting leads of an inductive write head according to the present invention. The capacitor and resistance of a load-side termination network of the present invention can be fabricated into the connecting leads of an inductive write head during the wafer processing, thus adding only minimal cost to the head. Such a read/write head is plug-compatible with existing magnetic recording technology because no additional external wiring is required. The additional resistance can be fabricated away from the recording head so that the power is dissipated over a relatively much larger area and so that heating effects are minimized.

While the present invention has been described in connection with the illustrated embodiments, it will be appreciated and understood that modifications may be made without departing from the true spirit and scope of the invention.

What is claimed is:

1. A magnetic recording circuit, comprising:
    a write driver output stage having a write signal output;
    a magnetic write head having a write signal input; and
    an interconnect circuit having an input, an output and a selected characteristic impedance $Z_0$, the input of the interconnect circuit being coupled to the write signal output of the write driver output stage, the output of the interconnect circuit being coupled to the write signal input of the write head, and the interconnect circuit being source-terminated and including a source-terminating circuit so that an output impedance $Z_D$ formed by the write driver output stage and the source-terminating circuit is substantially equal to the selected characteristic impedance $Z_0$ of the interconnect circuit.

2. The magnetic recording circuit according to claim 1, wherein the interconnect circuit is also load-terminated, the magnetic write head including a load-terminating circuit so that an input impedance $Z_I$ formed by the magnetic write head and the load-terminating circuit is substantially equal to the characteristic impedance $Z_0$ of the interconnect circuit.

3. The magnetic recording circuit according to claim 2, wherein the load-terminating circuit is formed by electrical components that are external to the magnetic write head.

4. The magnetic recording circuit according to claim 3, wherein the electrical components that are external to the magnetic write head are mounted on a suspension of the interconnect circuit.

5. The magnetic recording circuit according to claim 3, wherein the electrical components that are external to the magnetic write head are located on a slider with the magnetic write head.

6. The magnetic recording circuit according to claim 3, wherein the electrical components that are external to the magnetic write head are fabricated on a slider and integrated with the magnetic write head using the same fabrication processing.

7. The magnetic recording circuit according to claim 3, wherein the magnetic write head includes a coil having an inductance $L_h$ and a resistance $R_h$,
    wherein the load terminating circuit includes a first resistance $R_{ex}$ connected in a first series circuit with the coil of the magnetic write head, and a second resistance R connected in a second series circuit with a capacitance C,
    wherein the first and second series circuits are connected in parallel across the output of the interconnect circuit, and
    wherein the characteristic impedance $Z_0$ of the interconnect circuit, the inductance $L_h$ of the coil, the resistance $R_h$ of the coil, and the first resistance $R_{ex}$, the second resistance R and the capacitance C of the load-terminating network are related by $$Z_0 \simeq R \simeq R_{ex} + R_h \simeq \sqrt{\frac{L_h}{C}}.$$

8. The magnetic recording circuit according to claim 3, wherein the magnetic write head includes a coil having an inductance $L_h$, a resistance $R_h$, and a parasitic capacitance $C_{par}$,
    wherein the load-terminating circuit includes a first resistance $R_{ex}$ connected in a first series circuit with the coil of the magnetic write head, and a second resistance R connected in a second series circuit with a capacitance C,
    wherein the first and second series circuit are connected in parallel across the output of the interconnect circuit, and
    wherein the characteristic impedance $Z_0$ of the interconnect circuit, the inductance $L_h$, the resistance $R_h$ and the parasitic capacitance $C_{par}$ of the coil, and the first resistance $R_{ex}$, the second resistance R and the capacitance C of the load-terminating circuit are related by $$Z_0 \simeq R \simeq R_{ex} + R_h \simeq \sqrt{\frac{L_h - C_{par}R_h^2}{C}}.$$

9. The magnetic recording circuit according to claim 1, wherein the write driver output stage is a current-type write driver having an output impedance that is greater than the characteristic impedance $Z_0$ of the interconnect circuit, and
    wherein the source-terminating circuit is a resistance that is connected in shunt across the output impedance of the write driver output stage, the output impedance $Z_D$ formed by the impedance of the write driver output stage and the source-terminating circuit being substantially equal to the selected characteristic impedance $Z_0$ of the interconnect circuit.

10. The magnetic recording circuit according to claim 1, wherein the write driver output stage is a current-type write driver output stage having an output impedance that is greater than the selected characteristic impedance $Z_0$ of the interconnect circuit,
    the magnetic recording circuit further comprising a feedback circuit connected in parallel with the current-type write driver output stage, the feedback circuit reducing the output impedance of the output stage so that the output impedance of the write driver substantially equals the selected characteristic impedance of the interconnect circuit.

11. The magnetic recording circuit according to claim 1, wherein the write driver output stage is a voltage-type write driver output stage having an output impedance that is less that the characteristic impedance $Z_0$ of the interconnect circuit, and
    wherein the source-terminating circuit is a resistance connected in series with the output impedance of the write driver output stage, the output impedance $Z_D$ formed by the impedance of the write driver output stage and the source-terminating circuit being substantially equal to the selected characteristic impedance $Z_0$ of the interconnect circuit.

12. A disk drive, comprising:
    a magnetic disk having a magnetic medium for recording information; and
    a magnetic recording circuit including, a write driver output stage having a write signal output, a magnetic write head having a write signal input, and an interconnect circuit having an input, an output and a selected characteristic impedance $Z_0$, the input of the interconnect circuit being coupled to the write signal output of the write driver output stage, the output of the interconnect circuit being coupled to the write signal input of the write head, and the interconnect circuit being source-terminated and including a source-terminating circuit so that an output impedance $Z_D$ formed by the write driver output stage and the source-terminating circuit is substantially equal to the selected characteristic impedance $Z_0$ of the interconnect circuit.

13. The disk drive according to claim 12, wherein the interconnect circuit is also load-terminated, the magnetic write head including a load-terminating circuit so that an input impedance $Z_l$ formed by the magnetic write head and the load-terminating circuit is substantially equal to the characteristic impedance $Z_0$ of the interconnect circuit.

14. The disk drive according to claim 13, wherein the load-terminating circuit is formed by electrical components that are external to the magnetic write head.

15. The disk drive according to claim 14, wherein the electrical components that are external to the magnetic write head are mounted on a suspension of the interconnect circuit.

16. The disk drive according to claim 14, wherein the electrical components that are external to the magnetic write head are located on a slider with the magnetic write head.

17. The disk drive according to claim 14, wherein the electrical components that are external to the magnetic write head are fabricated on a slider and integrated with the magnetic write head using the same fabrication processing.

18. The disk drive according to claim 14, wherein the magnetic write head includes a coil having an inductance $L_h$ and a resistance $R_h$, wherein the load terminating circuit includes a first resistance $R_{ex}$ connected in a first series circuit with the coil of the magnetic write head, and a second resistance R connected in a second series circuit with a capacitance C, wherein the first and second series circuits are connected in parallel across the output of the interconnect circuit, and wherein the characteristic impedance $Z_0$ of the interconnect circuit, the inductance $L_h$ of the coil, the resistance $R_h$ of the coil, and the first resistance $R_{ex}$, the second resistance R and the capacitance C of the load-terminating network are related by $$Z_0 \simeq R \simeq R_{ex} + R_h \simeq \sqrt{\frac{L_h}{C}} .$$

19. The disk drive according to claim 14, wherein the magnetic write head includes a coil having an inductance $L_h$, a resistance $R_h$, and a parasitic capacitance $C_{par}$, wherein the load-terminating circuit includes a first resistance $R_{ex}$ connected in a first series circuit with the coil of the magnetic write head, and a second resistance R connected in a second series circuit with a capacitance C, wherein the first and second series circuit are connected in parallel across the output of the interconnect circuit, and wherein the characteristic impedance $Z_0$ of the interconnect circuit, the inductance $L_h$, the resistance R and the parasitic capacitance $C_{par}$ of the coil, and the first resistance $R_{ex}$, the second resistance R and the capacitance C of the load-terminating circuit are related by $$Z_0 \simeq R \simeq R_{ex} + R_h \simeq \sqrt{\frac{L_h - C_{par} R_h^2}{C}} .$$

20. The disk drive according to claim 12, wherein the write drive output stage is a current-type write driver having an output impedance that is greater than the characteristic impedance $Z_0$ of interconnect circuit, and wherein the source-terminating circuit is a resistance that is connected in shunt across the output impedance of the write driver output stage, the output impedance $Z_D$ formed by the impedance of the write driver output stage and the source-terminating circuit being substantially equal to the selected characteristic impedance $Z_0$ of the interconnect circuit.

21. The disk drive according to claim 12, wherein the write driver output stage is a current-type write driver output stage having an output impedance that is greater than the selected characteristic impedance $Z_0$ of the interconnect circuit, the magnetic recording circuit further comprising a feedback circuit connected in parallel with the current-type write driver output stage, the feedback circuit reducing the output impedance of the output stage so that the output impedance of the write driver substantially equals the selected characteristic impedance $Z_0$ of the interconnect circuit.

22. The disk according to claim 12, wherein the write driver output stage is a voltage-type write driver output stage having an output impedance that is less than the characteristic impedance $Z_0$ of the interconnect circuit, and wherein the source-terminating circuit is a resistance connected in series with the output impedance of the write driver output stage, the output impedance $Z_D$ formed by the impedance of the write driver output stage and the source-terminating circuit being substantially equal to the selected characteristic impedance $Z_0$ of the interconnect circuit.

* * * * *